(12) United States Patent
Wisniewski

(10) Patent No.: US 7,153,089 B2
(45) Date of Patent: Dec. 26, 2006

(54) STORAGE DEVICE

(75) Inventor: Michael A. Wisniewski, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 55 days.

(21) Appl. No.: 10/661,011

(22) Filed: Sep. 12, 2003

(65) Prior Publication Data

US 2005/0058531 A1    Mar. 17, 2005

(51) Int. Cl.
*B65G 59/02* (2006.01)
(52) U.S. Cl. ............................. 414/797.7; 414/788.2
(58) Field of Classification Search ............ 414/788.2, 414/795.6, 797.7, 798.5; 221/222, 297
See application file for complete search history.

(56) References Cited

U.S. PATENT DOCUMENTS

| | | | | |
|---|---|---|---|---|
| 1,667,483 A * | 4/1928 | Leof | ............................. | 221/96 |
| 3,112,038 A * | 11/1963 | Breivik | ..................... | 414/788.2 |
| 3,160,292 A * | 12/1964 | Albrecht | .................. | 414/788.2 |
| 3,323,680 A * | 6/1967 | Beer | .......................... | 221/221 |
| 3,455,484 A * | 7/1969 | Edwards | ..................... | 221/222 |
| 3,658,194 A * | 4/1972 | Gendron et al. | ......... | 414/795.6 |
| 3,895,477 A * | 7/1975 | Yamashita | ............... | 414/788.7 |
| 4,545,714 A * | 10/1985 | Johnson et al. | .......... | 414/788.2 |
| 4,547,114 A * | 10/1985 | Watrous et al. | .......... | 414/793.9 |
| 4,597,706 A * | 7/1986 | Michit | ..................... | 414/788.2 |
| 4,621,745 A | 11/1986 | Grace | | |
| 4,852,745 A * | 8/1989 | Lemaire et al. | ............. | 209/588 |
| 4,915,578 A * | 4/1990 | Becker | .................... | 414/797.6 |
| 4,919,587 A * | 4/1990 | Tashiro et al. | ........... | 414/795.8 |
| 4,955,783 A * | 9/1990 | Grazia | ......................... | 414/795 |
| 4,967,960 A * | 11/1990 | Futrell | ......................... | 221/222 |
| 4,987,721 A * | 1/1991 | Turtschan | ..................... | 53/167 |
| 5,088,883 A * | 2/1992 | Focke et al. | ................. | 414/795 |
| 5,372,473 A | 12/1994 | Moyden et al. | | |
| 5,480,280 A * | 1/1996 | Bordon | .................... | 414/798.1 |
| 5,487,637 A | 1/1996 | Mojden et al. | | |
| 5,823,738 A * | 10/1998 | Spatafora et al. | ........ | 414/795.1 |
| 5,836,737 A * | 11/1998 | Hashimoto et al. | ...... | 414/796.4 |
| 5,953,234 A | 9/1999 | Singer et al. | | |
| 6,135,705 A * | 10/2000 | Katoch | ........................ | 414/795 |
| 6,155,774 A * | 12/2000 | Spatafora | ................. | 414/789.9 |
| 6,201,203 B1 | 3/2001 | Tilles | | |
| 6,623,236 B1* | 9/2003 | Barnes | ..................... | 414/795.6 |
| 2002/0028129 A1* | 3/2002 | Kohler | ..................... | 414/795.3 |
| 2005/0002773 A1* | 1/2005 | Riesterer et al. | ......... | 414/795.6 |

* cited by examiner

*Primary Examiner*—Douglas Hess

(57) ABSTRACT

A storage device for storing trays, the device including a first movable member and a second movable member positioned opposite the first movable member. The first and second movable members are adapted to selectively vertically move and support at least one tray therebetween. A conveyor moves a tray to transfer position, and a transfer mechanism elevates the tray to a storage position between the two movable members. A stack of nested trays may be stored.

29 Claims, 7 Drawing Sheets

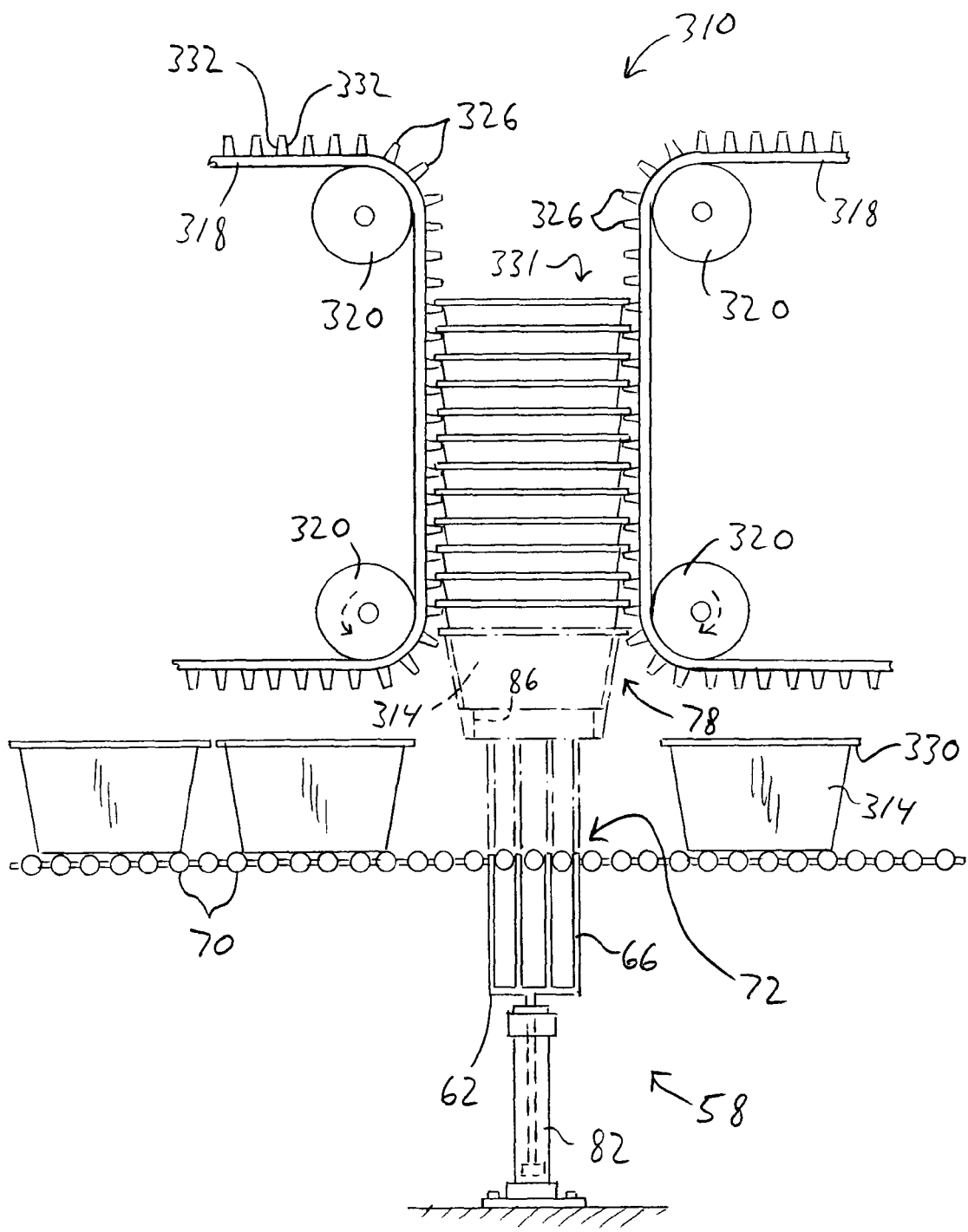

STORAGE DEVICE

FIELD OF THE INVENTION

This invention relates generally to storage devices, and more particularly to storage devices for storing trays.

BACKGROUND OF THE INVENTION

Typical handling systems (e.g., distribution systems, sorting systems, and the like) often utilize a container or tray for holding the components being handled. At times during the handling process, these trays may be emptied and stored for future use. Oftentimes, a buffer system is integrated into the handling system to accommodate storage of these empty trays. A buffer system usually includes conveyors, like the conveyors in the handling system, for individually and separately storing the empty trays. In this configuration of a buffer system, the empty trays may occupy large amounts of floor space and excess amounts of machinery (i.e., conveyors) for storing the empty trays. In addition, the empty trays must be transferred between the handling system and the buffer system upon storage, and from the buffer system back to the handling system for re-entry into the handling system. As a result of a complicated transfer point between the handling and buffer systems, a complicated transfer mechanism is typically required to transfer the empty trays between the handling and buffer systems. Such a transfer mechanism may also occupy large amounts of floor space.

SUMMARY OF THE INVENTION

The present invention provides a storage device for storing trays. The storage device includes a first movable member and a second movable member positioned opposite the first movable member. The first and second movable members selectively vertically support at least one tray therebetween.

The present invention also provides a method for storing trays. The method includes transporting a first tray to a transfer position, vertically transferring the first tray from the transfer position to a storage position, and supporting the first tray in the storage position by two opposed movable members.

BRIEF DESCRIPTION OF THE DRAWINGS

In the drawings, wherein like reference numerals indicate like parts:

FIG. 7 is a front view of the storage device of FIG. 6, illustrating a tray being transferred from the transfer position to the storage position.

Figure 1:
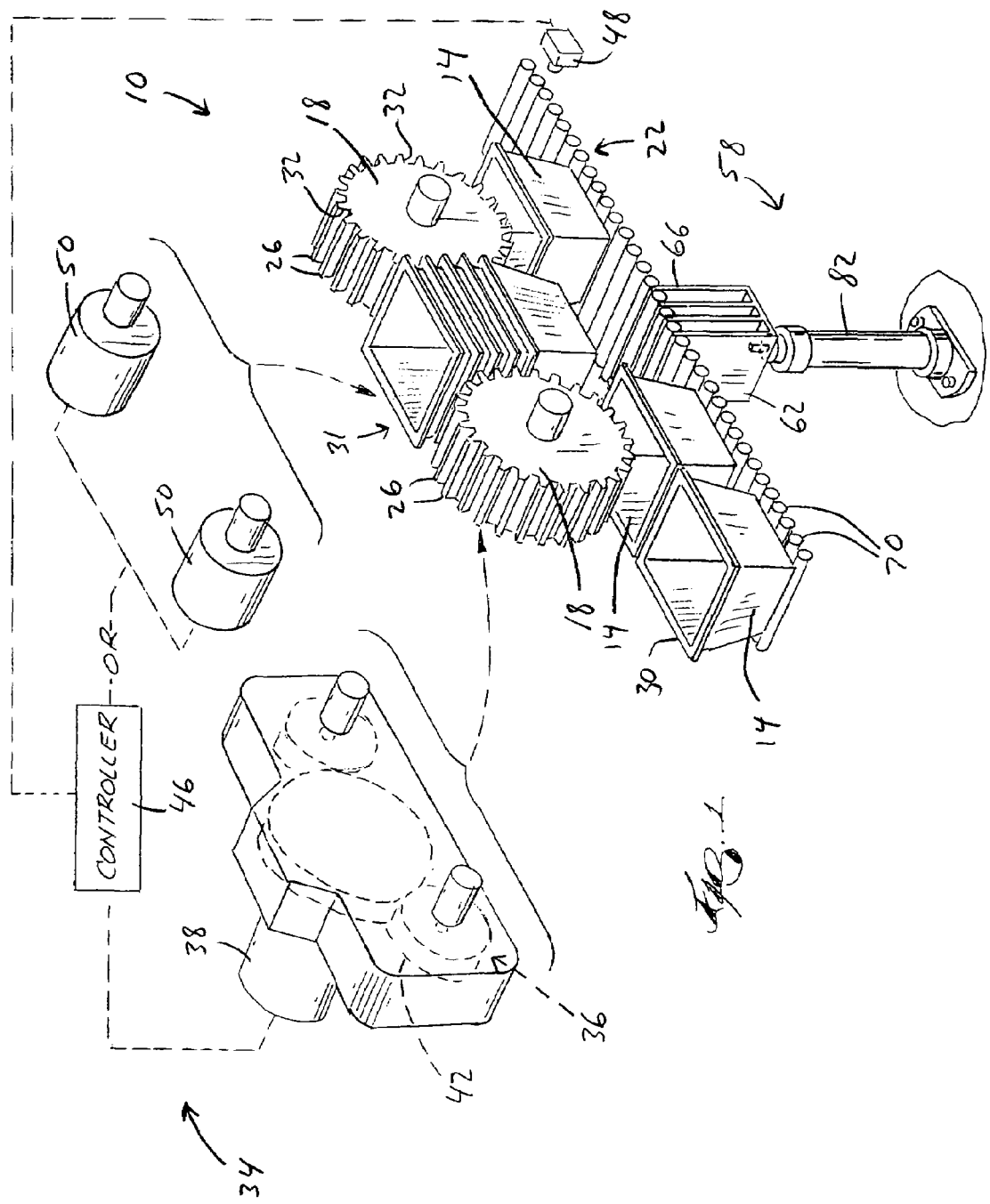
FIG. 1 is a perspective view of a storage device of the present invention.

Before any features of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

DETAILED DESCRIPTION

With reference to FIG. 1, a storage device 10 is utilized to vertically support empty trays 14 in a nested configuration. However, the storage device 10 may also be used to store trays 14 containing material. As used herein, a "tray" may be defined to include anything that may hold an object (i.e., the tray may be in the form of a substantially flat sheet, or in the form of a container having a depth). In the exemplary constructions, the storage device 10 takes advantage of the tapered shape of the trays 14 in that an inherent, predictable, and consistent spacing occurs between adjacent trays 14 upon nesting the trays 14. However, in other constructions of the storage device (not shown), any other tray configuration that provides predictable and consistent spacing between adjacent trays 14 may be used. The trays 14 shown and described herein may be utilized to carry, handle, and/or store mail or other parcels or packages.

Figure 2:
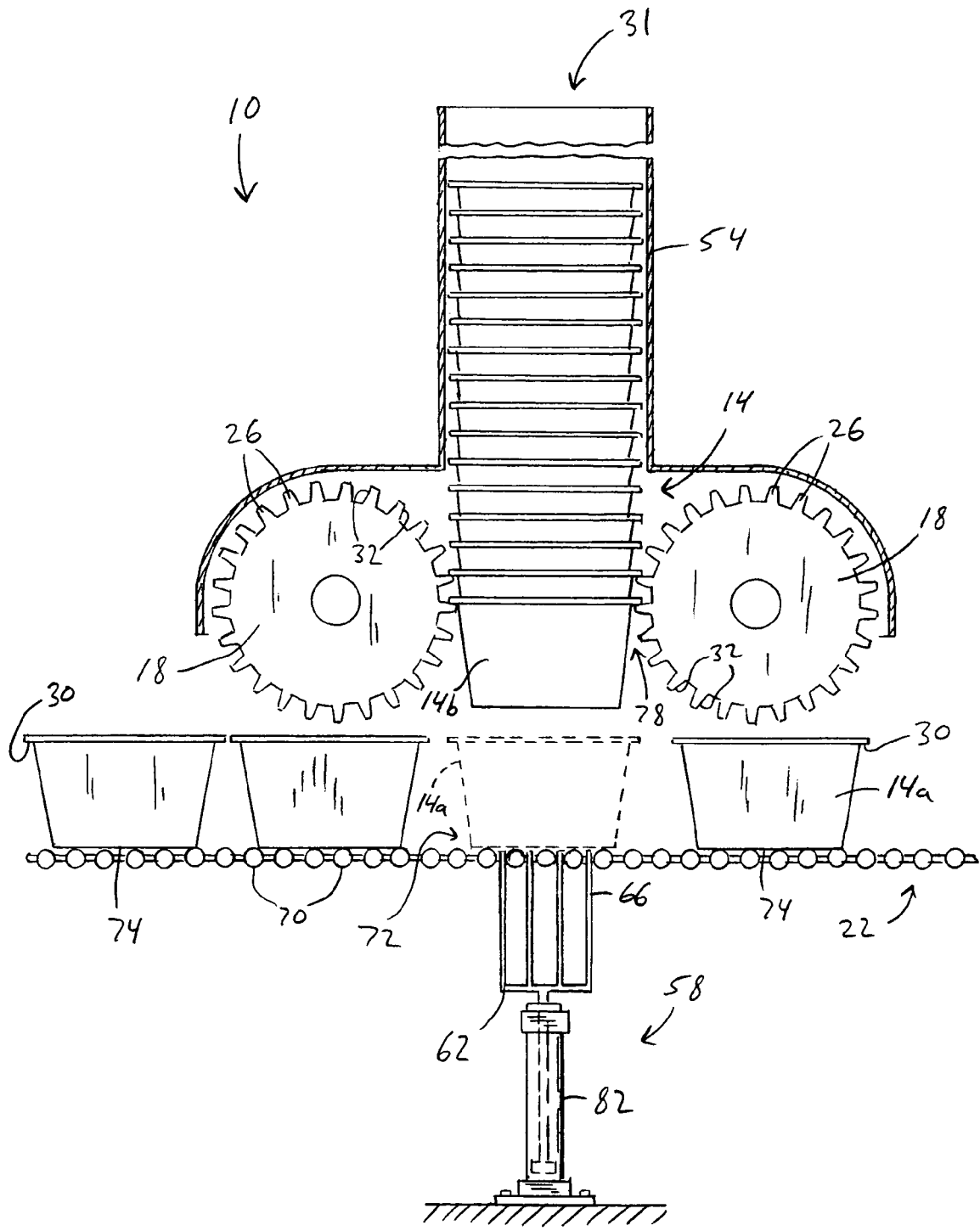
FIG. 2 is a front view of the storage device of FIG. 1, illustrating a tray being conveyed to a transfer position relative to the storage device.
Figure 3:
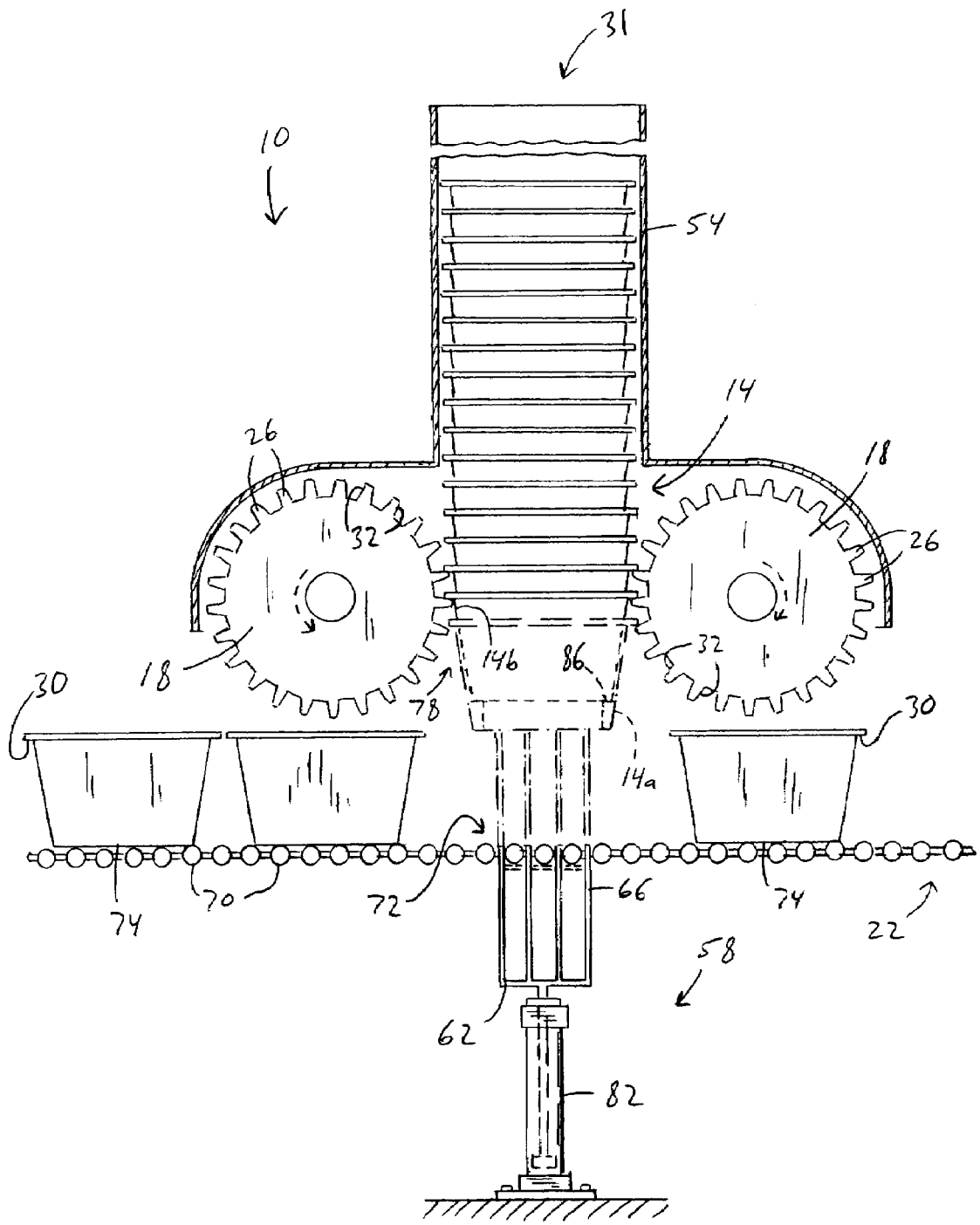
FIG. 3 is a front view of the storage device of FIG. 1, illustrating a tray being transferred from the transfer position to a storage position.

The storage device 10 includes two opposed movable members in the form of rotatable members, such as wheels 18, positioned above a conveyor 22. The conveyor 22 is a portion of a handling system (not shown) for transporting trays 14. As shown in FIGS. 2–3, the spacing between the wheels 18 is selected to receive the trays 14 therebetween from the conveyor 22. In one construction of the storage device 10, the wheels 18 include teeth 26 extending from their outer surfaces to engage a lip or rim 30 projecting from each tray 14 to support the trays 14 in a vertical column or stack 31. However, in other constructions of the storage device, the trays 14 may be supported in a substantially vertical column or stack, such that the stack may be tilted relative to the ground or other supporting surface. The teeth 26 have a pitch corresponding with the inherent spacing of the trays 14 when the trays 14 are nested. The teeth 26 also include tapered surfaces 32, such that the rim 30 of a particular tray 14 may be smoothly engaged upon sliding contact between the teeth 26 and the rim 30. However, the teeth 26 may include any of a number of different shapes that provide smooth engagement with the rim 30 of a tray 14.

Figure 4:
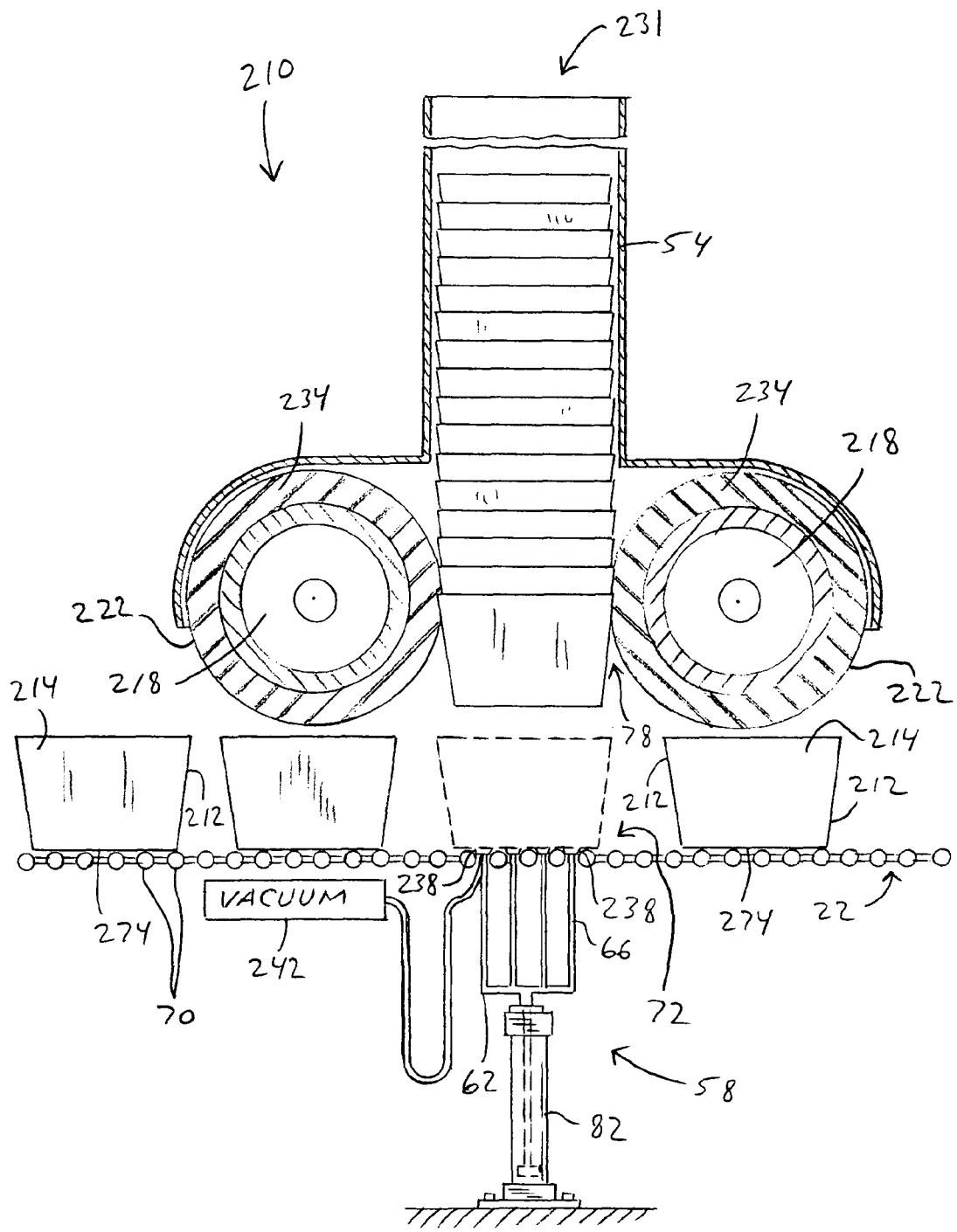
FIG. 4 is a front view of another construction of the storage device, illustrating a tray being conveyed to the transfer position.
Figure 5:
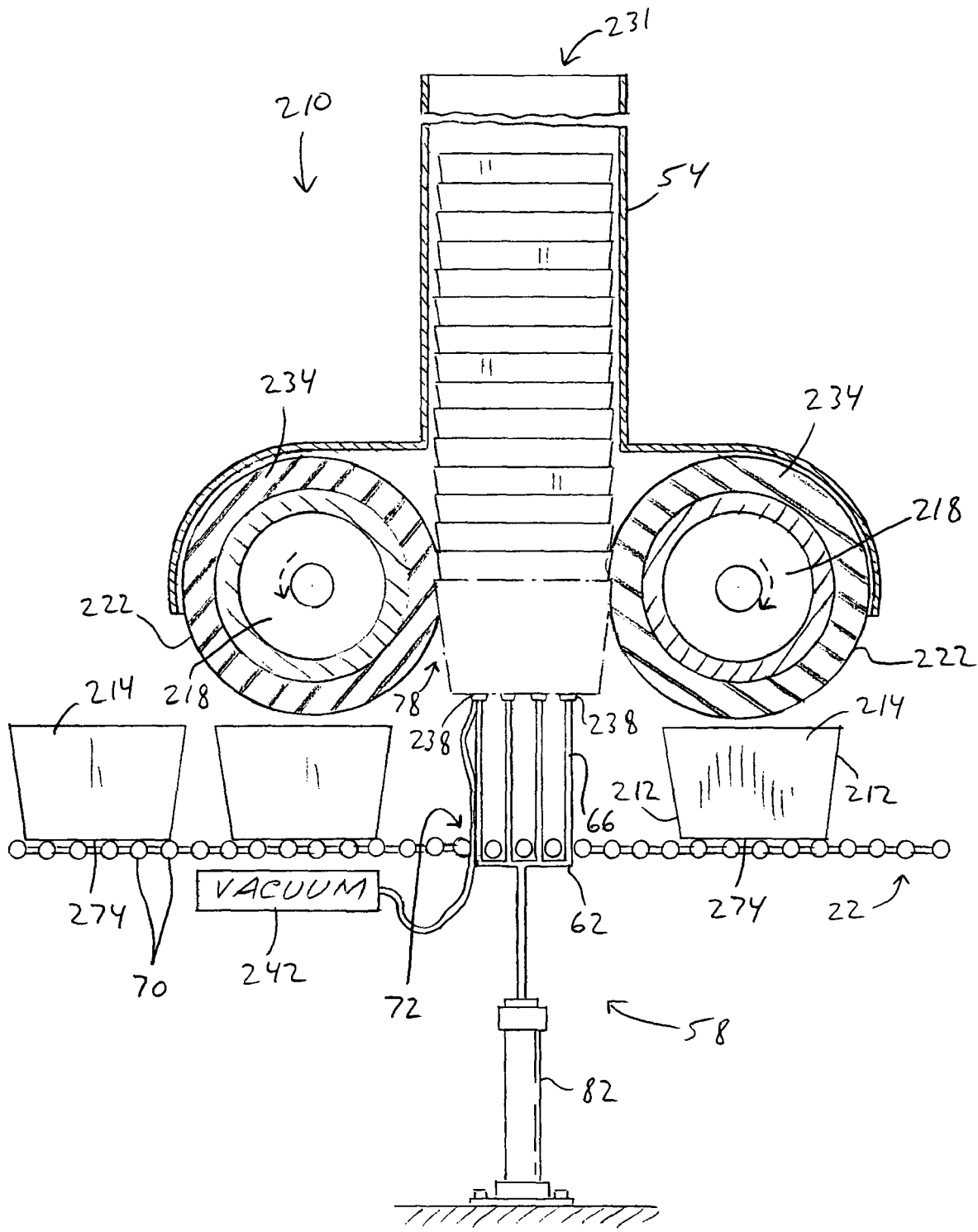
FIG. 5 is a front view of the storage device of FIG. 4, illustrating a tray being transferred from the transfer position to the storage position.

Another construction of the storage device 210 is shown in FIGS. 4–5. The storage device 210 is similar to the storage device 10 of FIGS. 1–3, except the movable members are in the form of different rotatable members, such as opposed wheels 218 having respective outer frictional surfaces 222. As such, like components are labeled with like reference numerals. The storage device 210 may be particularly useful in handling trays 214 that do not include rims or lips therearound. The respective outer frictional surfaces 222 of the opposing wheels 218 frictionally engage opposite sides 212 of the trays 214 to support the trays 214 in a vertical column or stack 231. The wheels 218 may include resilient coverings 234 (e.g., rubber coverings) that at least partially deform upon supporting a tray 214 therebetween, such that frictional forces are developed between the respective outer frictional surfaces 222 and the sides 212 of the trays 214 to maintain the tray 214 in position between the wheels 218. Further, the outer frictional surfaces 222 may include some sort of gripping surfaces (e.g., raised or knurled surfaces) to provide additional grip on the sides 212 of the trays 214.

Figure 6:
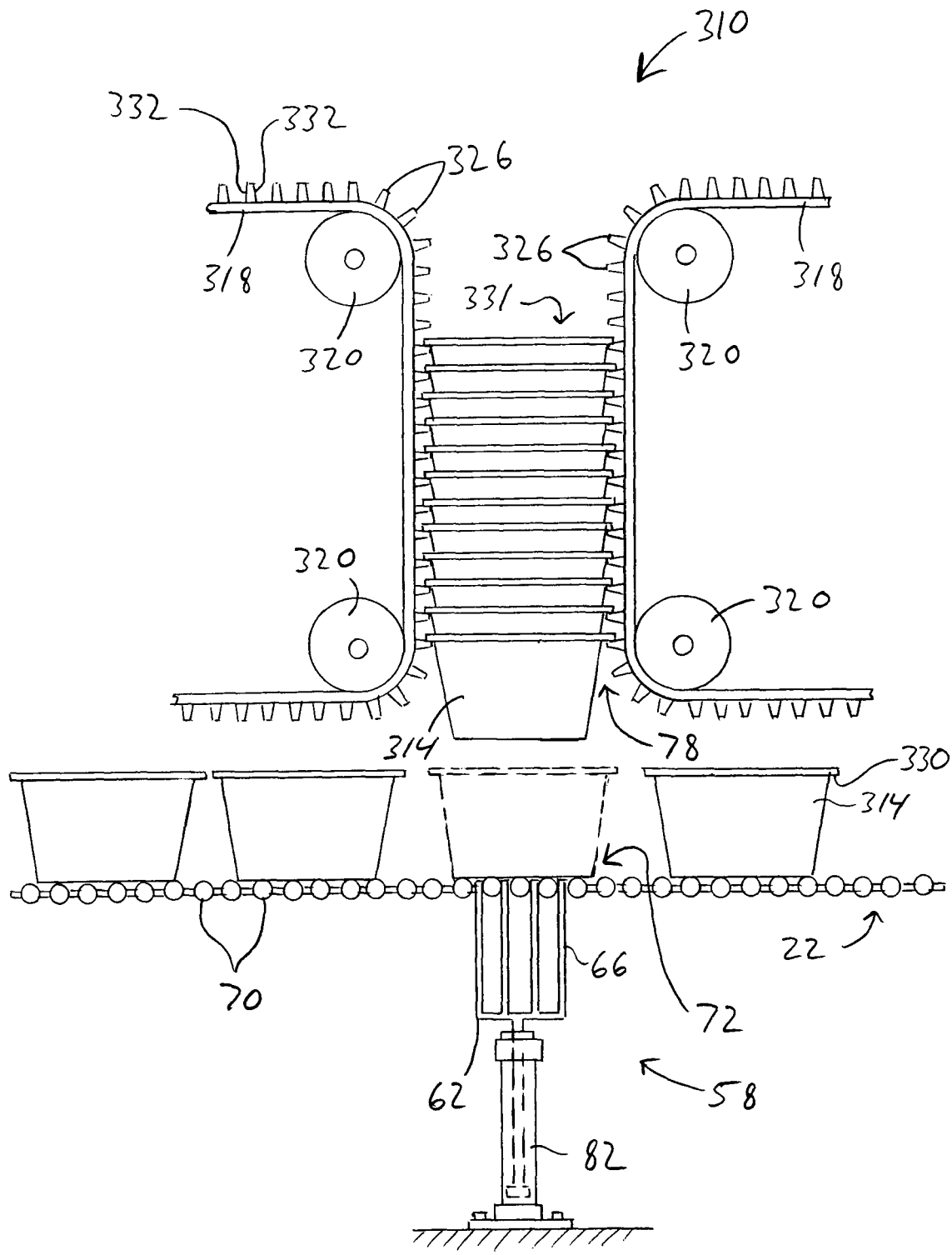
FIG. 6 is a front view of yet another construction of the storage device, illustrating a tray being conveyed to the transfer position.

Yet another construction of the storage device 310 is shown in FIGS. 6–7. The storage device 310 is similar to the storage device 10 of FIGS. 1–3, except the movable members are in the form of opposed belts 318. As such, like components are labeled with like reference numerals. The belts 318 may be continuous belts arranged in any of a number of different belt runs. However, the belts 318 may also be discontinuous, such that the belts 318 have distinguishable ends that are wound and unwound on respective spools (not shown) depending on the direction of movement of the belts 318. At least one roller 320 in each belt run may be driven to provide movement to a respective belt 318.

The belts 318 include projections 326 extending therefrom to engage a rim 330 projecting from each tray 314 to support the trays 314 in a vertical column or stack 331. The projections 326 have a pitch corresponding with the inherent spacing of the trays 314 when the trays 314 are nested. The projections 326 also include tapered surfaces 332, such that the rim 330 of a particular tray 314 may be smoothly engaged upon sliding contact between the projections 326 and the rim 330. However, the projections 326 may include any of a number of different shapes that provide smooth engagement with the rim 330 of a tray 314.

As shown in FIG. 1, the wheels 18 are powered by a drive mechanism 34. For proper operation of the storage device 10, the wheels 18 should be synchronized and driven in opposite directions (as shown in FIG. 3). In one construction of the storage device 10, the drive mechanism 34 may utilize a mechanical linkage 36 coupling the two wheels 18 to ensure that the two wheels 18 are synchronized. The mechanical linkage 36 is driven by a motor 38, such as a servo-motor, or a stepper motor providing a stepped torque input to the mechanical linkage 36 rather than a continuous torque input. Such a mechanical linkage 36 may include a gear train 42, which provides a torque output to each wheel 18. The mechanical linkage 36 may be any of a number of conventional designs, and should not be limited by the gear train 42 illustrated in FIG. 1. A controller 46 may be electrically connected with the motor 38 and the handling system's control system (not shown) to control operation of the motor 38 and subsequently the wheels 18. A sensor 48 may also be positioned adjacent the conveyor 22 for detecting a presence or absence of a tray 14. Further, the sensor 48 may be electrically connected with the controller 46 to provide a signal to the controller 46 upon detecting or not detecting a tray 14 on the conveyor 22. However, any number of alternate sensing devices may be utilized to detect the presence or absence of a tray 14 on the conveyor 22.

In another construction of the storage device 10, the drive mechanism 34 may utilize an electronic linkage coupling the two wheels 18 to ensure that the two wheels 18 are synchronized. Such an electronic linkage may include individual motors 50 providing torque inputs to the respective wheels 18. The motors 50 may be electrically connected to the controller 46, which operates the two motors 50 in synchronism with one another. Like the motor 38 driving the mechanical linkage 36, the motors 50 may also be servomotors, or stepper motors providing stepped torque inputs to the wheels 18 rather than a continuous torque input. Further, the sensor 48 may be electrically connected with the controller 46 to provide a signal to the controller 46 upon detecting or not detecting a tray 14 on the conveyor 22. Further, similar drive mechanisms may also be used to drive the wheels 218 of the storage device 210 of FIGS. 4–5, and the rollers 320 of the storage device 310 of FIGS. 6–7.

A frame (not shown) may support the wheels 18 and the drive mechanism 34 relative to the conveyor 22. Further, the frame may be adjustable to accommodate different size trays 14 to be stored. The drive mechanism 34 utilizing the electronic linkage between the individual motors 50 is especially adept to an adjustable frame for accommodating different size trays 14 since the distance between the wheels 18 may be changed. A shroud 54 (see FIGS. 2–3) supported by the frame or other structure may also be placed over the wheels 18 and the trays 14 to provide a barrier between the wheels 18 and their surrounding environment and lateral support to the stack 31 of nested trays 14 supported by the wheels 18.

A transfer mechanism 58 in the form of a lifter 62 transfers selective trays 14 from the conveyor 22 toward the wheels 18 for storage. The lifter 62 includes multiple projections, or tines 66 that are insertable between individual rollers 70 of a portion of the conveyor defining a transfer position 72. During operation of the lifter 62, the tines 66 vertically protrude through the conveyor 22 to abut a bottom surface 74 of a select tray 14a (see FIG. 2) to lift the tray 14a from the conveyor 22 toward the wheels 18 for storage in a storage position 78. The lifter 62 may be driven by any of a number of mechanisms, such as a pneumatic or hydraulic cylinder 82, a rack and pinion linkage (not shown), and the like. Further, the transfer mechanism 58 may be electrically connected with the controller 46 to receive an operating signal from the controller 46.

FIGS. 4–5 illustrate multiple suction devices 234 coupled to the ends of the tines 66. The suction devices 234 are operable to grip the bottom surface 274 of a tray 214 when moving the tray 214 from the transfer position 72 to the storage position 78, or from the storage position 78 to the transfer position 72. The suction devices 234 may be in the form of conventional suction cups that cling onto the bottom surface 274 of the tray 214 when pressed against the bottom surface 274 of the tray 214. However, the suction devices 234 may also be in the form of suction cups that are fluidly connected with a vacuum source 242. The vacuum source 242 may be electrically connected with the controller 46 to selectively draw a vacuum from the suction cups upon the suction cups abutting against the bottom surface 274 of the tray 214. As shown in FIGS. 4–5, only one of the suction devices 234 is fluidly connected to the vacuum source 242. However, in other constructions of the storage device 210, more than one of the suction devices 234 may be fluidly connected with the vacuum source. Also, although the suction devices 234 and the vacuum source 242 are shown being utilized in the storage device 210 of FIGS. 4–5, the suction devices 234 and the vacuum source 242 may also be utilized in the storage device 10 of FIGS. 1–3 or the storage device 310 of FIGS. 6–7.

During operation of the storage device 10 in combination with the handling system, the conveyor 22 is initially loaded with successive trays 14. The sensor 48 detects the presence or absence of a tray 14 on the conveyor 22 as the successive trays 14 move toward the transfer position 72. The sensor 48 interfaces with the controller 46, and perhaps the handling system's control system, to determine whether or not any particular tray 14a should be stored or allowed to pass by the storage device 10 en route to another portion of the handling system, or whether a stored tray 14*b* should be lowered onto the conveyor 22 for re-entry into the handling system (see FIG. 2).

In one manner of operation of the storage device 10, the sensor 48 may detect a particular tray 14*a* on the conveyor 22 and the handling system's control system may designate the tray 14*a* as one to be stored. The conveyor 22 then transports the tray 14*a* to the transfer position 72, whereby the tray 14*a* is positioned directly above the lifter 62. The lifter 62 is then actuated upwards through the conveyor 22 to abut the bottom surface 74 of the tray 14*a* and lift the tray 14*a* off the conveyor 22 (see FIG. 3). At this time, the suction devices 234 and/or the vacuum source 242 may be employed to cling onto the bottom surface 74 of the tray 14*a* to provide the lifter 62 with a firm grasp of the tray 14*a*. The lifter 62 lifts the tray 14*a* up to a point whereby the teeth 26 of the opposed wheels 18 can engage the rim 30 of the tray 14*a*. The wheels 18 are then driven incrementally so that the teeth 26 engage the rim 30 of the tray 14*a* and lift the tray 14*a* off the lifter 62. If the suction devices 234 and/or the vacuum source 242 are being employed, the vacuum source 242 is deactivated at some time before the tray 14*a* is lifted off of the lifter 62 to release the tray 14*a*. If an existing tray 14*b* is already being supported by the wheels 18, then the tray 14*b* becomes nested within the tray 14*a* upon the tray 14*a* being raised by the lifter 62 and engaged by the wheels 18. Further rotation of the wheels 18 upwardly displaces the tray 14*b*. Subsequent trays 14 being stored in this manner are upwardly displaced relative to the handling system and form the vertical column or stack 31 of nested trays 14 in the storage position 78.

In another manner of operation of the storage device 10, the sensor 48 may detect a particular tray 14 on the conveyor 22 and the handling system's control system may designate the tray 14 for use in a later portion of the handling system. The particular tray 14 is then allowed to pass by the transfer position 72 without being transferred to the storage position 78.

In yet another manner of operation of the storage device 10, the sensor 48 may detect the absence of a tray 14, and the handling system's control system may determine that a stored tray 14 should re-enter the handling system by filling the vacancy on the conveyor 22. In this instance, the lifter 62 is actuated upwards to a point whereby the tips of the tines 66 are slightly below the bottom surface 74 of the lowest tray 14*a* (see FIG. 3) that is to re-enter the handling system. The wheels 18 are then incrementally driven so that the tray 14*a* is downwardly displaced and separated from the stack 31 of nested trays 14, and further allowed to fall onto the tines 66.

The trays 14 may include integrally formed stops 86 extending from the bottom walls of the trays 14 to provide consistent nesting between the trays 14 and to prevent the trays 14 from nesting too close together such that any two nested trays 14 may not be readily separated. As a result, the lowest tray 14*a* (see FIG. 3) in the stack 31 of nested trays 14 should easily separate from the stack 31 of nested trays 14 and fall onto the tines 66. However, the suction devices 234 and/or the vacuum source 242 may be used to grasp the lowest tray 14*a* to forcibly separate the tray 14*a* from the stack 31. The lifter 62 then moves downward and places the bottom surface 74 of the tray 14 back onto the conveyor 22 in a location corresponding with the vacancy sensed by the sensor 48.

Operation of the storage device 210 is substantially similar to the previously-described operation of the storage device 10, with the exception that the outer frictional surfaces 222 engage opposite sides 212 of the tray 214 rather than the rim 30 of the tray 14.

Operation of the storage device 310 is also substantially similar to the previously-described operation of the storage device 10. However, since opposed projections 326 on the belts 318 may support at least one tray therebetween, the trays 314 are not required to nest within each other. In such a configuration, two opposed projections 326 may only be responsible for supporting the weight of one tray 314, rather than multiple trays 314. Further, a shroud or protective guard may be positioned around the belts 318 and/or the stack 331.

I claim:

1. A storage device for storing trays, comprising:
    a first rotatable member;
    a second rotatable member positioned opposite the first rotatable member, the first and second rotatable members adapted to selectively support at least one tray therebetween; and
    at least one transfer mechanism including a lifter, the same lifter being movable relative to the tray to both selectively insert and remove the tray between the first and second rotatable members;
    wherein the first and second rotatable members include teeth extending from their respective outer surfaces, and wherein the teeth engage a lip on the tray to lift the tray off of the lifter.

2. The storage device of claim 1, wherein the first and second rotatable members include first and second wheels, respectively.

3. The storage device of claim 1, wherein each of the first and second rotatable members engages the same tray.

4. The storage device of claim 1, wherein the at least one tray comprises a plurality of nested trays in a vertical column having an uppermost tray and a lowest tray.

5. The storage device of claim 4, wherein the lowest tray of the plurality of nested trays is supported by the first and second rotatable members.

6. The storage device of claim 1, wherein the at least one tray includes a stack of nested trays having an uppermost tray and a lowest tray, and wherein the lowest tray is supported by the teeth of the first and second rotatable members.

7. The storage device of claim 1, wherein the teeth are configured with a tapered shape.

8. The storage device of claim 1, further comprising at least one motor driving the first and second rotatable members.

9. The storage device of claim 8, further comprising a gearbox coupling the at least one motor and the rotatable members.

10. The storage device of claim 9, wherein the gearbox drives the first and second rotatable members in opposite directions at substantially the same speed.

11. The storage device of claim 1, wherein the first rotatable member is driven by a first motor, and the second rotatable member is driven by a second motor.

12. The storage device of claim 11, further comprising a controller operable to drive the first motor and the second motor.

13. The storage device of claim 1, wherein the first and second rotatable members are driven in opposite directions at substantially the same speed.

14. The storage device of claim 1, wherein the transfer mechanism is configured for transferring a tray from a transfer position to a storage position.

15. The storage device of claim 14, further comprising a conveyor configured to transport the tray to and from the transfer position.

16. The storage device of claim 14, wherein the transfer mechanism elevates the tray from the transfer position to the storage position.

17. The storage device of claim 14, wherein the first and second rotatable members receive therebetween successive trays from the transfer mechanism, and wherein the rotatable members store the successive trays in a nested configuration in the storage position.

18. The storage device of claim 1, wherein the transfer mechanism is configured for transferring the tray from a transfer position to a storage position, wherein the storage device further includes a conveyor configured to transport the tray to and from the transfer position, and wherein the transfer mechanism includes at least one tine movable through the conveyor, the at least one tine engaging the tray located at the transfer position and moving the tray to the storage position.

19. The storage device of claim 18, further comprising at least one suction device coupled to the tine, the at least one suction device being engageable with a bottom surface of the tray to cling to the tray.

20. The storage device of claim 19, wherein the at least one suction device utilizes a source of vacuum to assist the at least one suction device in clinging onto the bottom surface of the tray.

21. The storage device of claim 1, further comprising a shroud substantially covering the first rotatable member, the second rotatable member, and the at least one tray supported by the rotatable members.

22. The storage device of claim 1, wherein the lifter is movable to both selectively insert and remove a single tray between the first and second rotatable members.

23. The storage device of claim 1, wherein the teeth engage the lip on the tray to lower the tray onto the lifter.

24. A storage device for storing trays, comprising:
a first rotatable member;
a second rotatable member positioned opposite the first rotatable member, the first and second rotatable members adapted to selectively support at least one tray therebetween; and
at least one transfer mechanism including a lifter, the same lifter being movable relative to the tray to both selectively insert and remove the tray between the first and second rotatable members,
wherein the transfer mechanism includes at least one suction device, the at least one suction device being engageable with a bottom surface of the tray to cling to the tray.

25. The storage device of claim 24, wherein the at least one suction device utilizes a source of vacuum to assist the at least one suction device in clinging onto the bottom surface of the tray.

26. A method for storing trays, comprising:
transporting a first tray to a transfer position;
lifting the first tray from the transfer position to a storage position;
supporting the first tray in the storage position by two opposed rotatable members; and
lowering the first tray from the storage position to the transfer position.

27. The method of claim 26, further comprising:
transporting a second tray to the transfer position;
lifting the second tray from the transfer position to the storage position; and
nesting the first and second trays.

28. The method of claim 27, further comprising:
supporting the second tray in the storage position by the two rotatable members; and
lowering the second tray from the storage position to the transfer position.

29. The method of claim 26, wherein lifting the first tray includes:
elevating the first tray from the transfer position; and
driving the two opposing rotatable members in opposite directions to engage and elevate the first tray to the storage position.

* * * * *